US009538168B2

(12) United States Patent
Imajo et al.

(10) Patent No.: US 9,538,168 B2
(45) Date of Patent: Jan. 3, 2017

(54) DETERMINATION DEVICE AND DETERMINATION METHOD (71) Applicant: FUJITSU LIMITED, Kawasaki-shi, Kanagawa (JP)

(72) Inventors: Chikara Imajo, Fukuoka (JP); Koji Takata, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 292 days.

(21) Appl. No.: 14/490,794

(22) Filed: Sep. 19, 2014

(65) Prior Publication Data

US 2015/0002644 A1    Jan. 1, 2015

Related U.S. Application Data (63) Continuation of application No. PCT/JP2012/058756, filed on Mar. 30, 2012.

(51) Int. Cl.
H04N 13/04 (2006.01)
H04N 13/00 (2006.01)

(52) U.S. Cl.
CPC ...... H04N 13/0497 (2013.01); H04N 13/0007 (2013.01); H04N 13/0452 (2013.01);
(Continued)

(58) Field of Classification Search
CPC ............ H04N 13/0497; H04N 13/0452; H04N 13/0007; H04N 13/0454; H04N 2013/0081; H04N 2013/0085
(Continued)

(56) References Cited

U.S. PATENT DOCUMENTS 6,614,927 B1    9/2003 Tabata
6,996,267 B2    2/2006 Tabata
(Continued)

FOREIGN PATENT DOCUMENTS

JP    09-009300    1/1997
JP    11-355808    12/1999
(Continued)

OTHER PUBLICATIONS

Japanese Office Action mailed Dec. 22, 2015 for corresponding Japanese Patent Application No. 2014-507301 with Partial English Translation, 6 pages.
(Continued)

Primary Examiner — Allen Wong
(74) Attorney, Agent, or Firm — Fujitsu Patent Center (57) ABSTRACT A determination device includes a memory and a processor coupled to the memory. The processor executes a process including: loading a plurality of video image signals including stereo images between which a position of an object in the stereo images differs in accordance with a parallax; performing block matching processing on the stereo images to detect a motion vector on a block-by-block basis in one of the stereo images and to calculate similarity on a block-by-block basis; determining whether to display a three-dimensional screen based on the stereo images or a two-dimensional screen, based on the motion vector or the similarity, or a combination thereof; and adding a result of the determining to the stereo images and outputting the stereo images added with the result to a display device that displays the stereo images.

6 Claims, 7 Drawing Sheets (52) U.S. Cl.
CPC . *H04N 13/0454* (2013.01); *H04N 2013/0081* (2013.01); *H04N 2013/0085* (2013.01)

(58) Field of Classification Search
USPC .......................................................... 348/51
See application file for complete search history.

(56) References Cited

U.S. PATENT DOCUMENTS

| | | | |
|---|---|---|---|
| 2004/0057612 A1* | 3/2004 | Tabata | H04N 13/0011 382/154 |
| 2004/0208357 A1 | 10/2004 | Tokuhashi et al. | |
| 2008/0285127 A1 | 11/2008 | Ochi | |
| 2011/0242294 A1* | 10/2011 | Noguchi | H04N 5/145 348/51 |

FOREIGN PATENT DOCUMENTS

| | | |
|---|---|---|
| JP | 2002-271818 | 9/2002 |
| JP | 2003-018619 | 1/2003 |
| JP | 2004-200813 | 7/2004 |
| JP | 2004-274253 | 9/2004 |
| JP | 2010-068309 | 3/2010 |
| JP | 2011-151517 | 8/2011 |
| JP | 2011-205702 | 10/2011 |
| WO | 03005734 | 1/2003 |
| WO | 2006054518 | 5/2006 |

OTHER PUBLICATIONS

International Search Report, mailed in connection with PCT/JP2012/058756 and mailed Jun. 12, 2012.

* cited by examiner

TIME

DETERMINATION DEVICE AND DETERMINATION METHOD

CROSS-REFERENCE TO RELATED APPLICATION

This application is a continuation of International Application No. PCT/JP2012/058756, filed on Mar. 30, 2012 and designating the U.S., the entire contents of which are incorporated herein by reference.

FIELD

The embodiment discussed herein is directed to a determination device and a determination method.

BACKGROUND

A technology is known for generating a stereogram for displaying a stereoscopic video image from stereo images that are captured with a plurality of image capturing devices. The stereo images referred to herein are, for example, a set of two images with a given parallax. A digital camera, a camera provided to a portable terminal device, and a camera provided to a personal computer (PC) are examples of image capturing devices.

Stereoscopic video image scenes may have a flaw in that users feel uncomfortable with a scene where an object contained in a stereoscopic video image suddenly moves due to a sudden movement of the image capturing device or a scene where an object close to the image capturing device moves.

It is assumed that one of the reasons users feel uncomfortable is that the parallax is too large. Thus, technologies for reducing user discomfort have been proposed. For example, a device that displays images performs block matching when performing image decoding and detects similar blocks between stereo images. Such a device use the detected blocks to calculate the amount of parallax and displays a three-dimensional or two-dimensional screen according to the amount of parallax. In another example, a device that displays a stereoscopic video image calculates the level of fatigue a user has and announces the risk when the calculated level of fatigue is equal to or larger than a given value.

Patent Document 1: Japanese Laid-open Patent Publication No. 11-355808
Patent Document 2: Japanese Laid-open Patent Publication No. 2011-205702

However, the above-described conventional technology has a problem in that the load is heavy when processing is performed by a device that displays images. Specifically, such a device performs block matching processing, which has a heavy processing load. For this reason, the load is heavy when processing is performed by a device that displays images. Block matching processing may be performed by a device that performs image encoding processing.

SUMMARY

According to an aspect of an embodiment, a determination device includes a memory and a processor coupled to the memory. The processor executes a process including: loading a plurality of video image signals including stereo images between which a position of an object in the stereo images differs in accordance with a parallax; performing block matching processing on the stereo images to detect a motion vector on a block-by-block basis in one of the stereo images and to calculate similarity on a block-by-block basis; determining whether to display a three-dimensional screen based on the stereo images or a two-dimensional screen, based on the motion vector or the similarity, or a combination thereof; and adding a result of the determining to the stereo images and outputting the stereo images added with the result to a display device that displays the stereo images.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The embodiment does not limit the technology disclosed herein.

Figure 1:
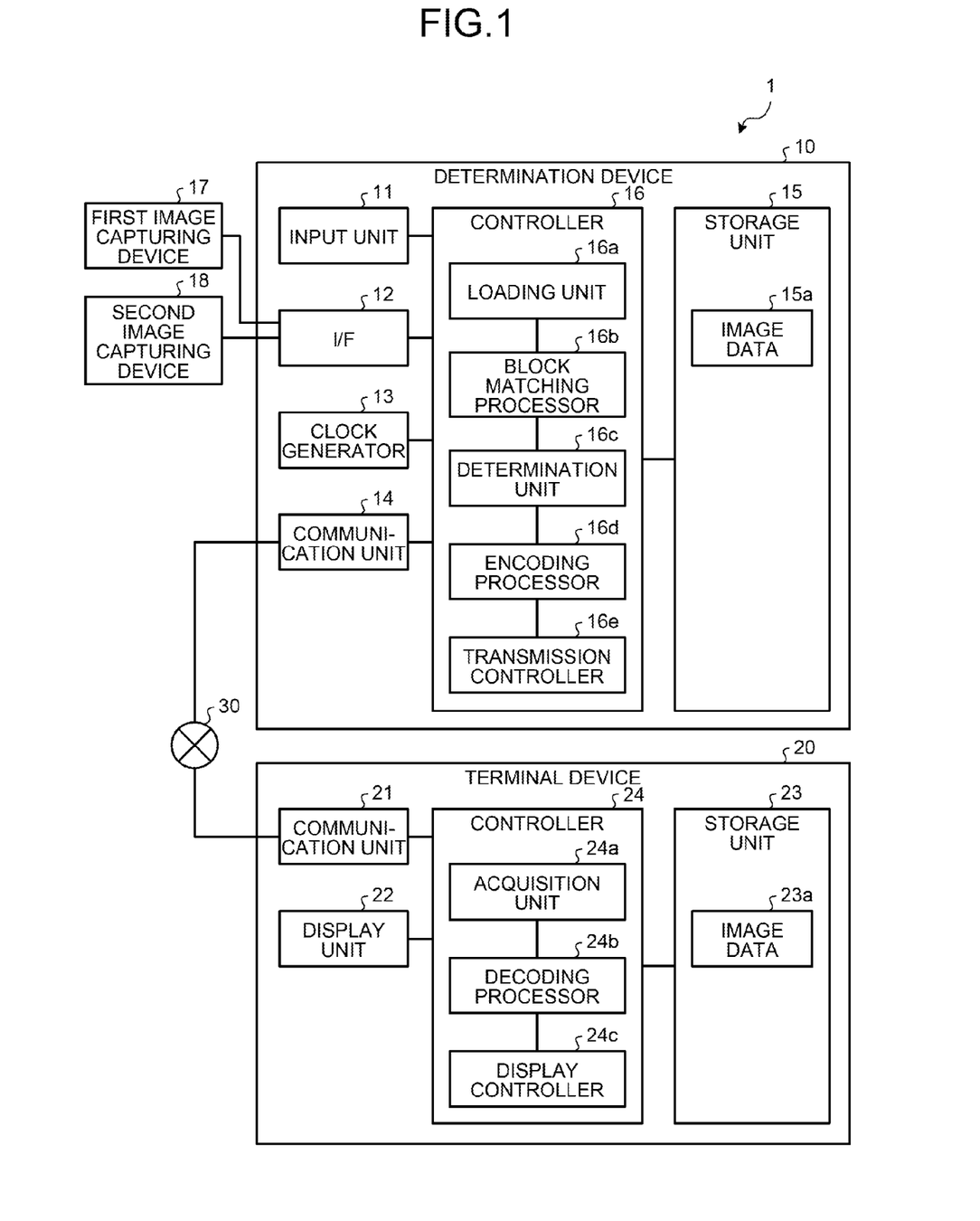
FIG. 1 illustrates an exemplary system configuration to which a determination device according to an embodiment is applied.

The determination device according to the embodiment will be described below. FIG. 1 illustrates an exemplary system configuration to which the determination device according to the embodiment is applied. As illustrated in FIG. 1, a system 1 includes a determination device 10 and a terminal device 20. The determination device 10 and the terminal device 20 are connected to each other via a network 30.

Configuration of Determination Device

As illustrated in FIG. 1, the determination device 10 includes an input unit 11, an interface (I/F) 12, a clock generator 13, a communication unit 14, a storage unit 15, and a controller 16.

The input unit 11 inputs information to the controller 16. For example, the input unit 11 receives an instruction from a user and inputs an instruction for executing determination processing, which will be described below, to the controller 16. A keyboard and a mouse are examples of the input unit 11.

The I/F 12 is a communication interface for implementing communications of the controller 16 with a first image capturing device 17 and a second image capturing device 18. For example, the I/F 12 is connected to the first image capturing device 17 and the second image capturing device 18. The I/F 12 receives image data that is transmitted from the first image capturing device 17 and the second image capturing device 18 and transmits the received image data to the controller 16.

The clock generator 13 generates clock signals. For example, the clock generator 13 generates clock signals for synchronizing the image data that is transmitted from the first image capturing device 17 with the image data that is transmitted from the second image capturing device 18 and transmits the clock signals to the controller 16. The frequency of the clock signals is, for example, 27 MHz. However, the frequency of the clock signals is not limited to this and an arbitrary value may be used.

The communication unit 14 implements communications of the determination device 10 with the terminal device 20. For example, upon receiving encoded image data from the controller 16, the communication unit 14 transmits the received image data to the terminal device 20 via the network 30. In this manner, the communication unit 14 outputs encoded image data.

The first image capturing device 17 and the second image capturing device 18 are provided in positions between which there is a given distance and each of the image capturing devices acquires image data (frames) at a given frame rate. The first image capturing device 17 and the second image capturing device 18 transmit the acquired image data to the determination device 10. Accordingly, the determination device 10 can acquire image data of a set of two images with a difference corresponding to a given parallax at the given frame rate. Because the determination device 10 deals with such image data as signals to be used for a video image, signals containing "image data" can be referred to as "video image signals" below. In the following descriptions, the "set of two images" can be referred to as the "stereo images" below. Furthermore, an image that is acquired by the first image capturing device 17 is referred to as a right-eye image and an image that is acquired by the second image capturing device 18 is referred to as a left-eye image.

The storage unit 15 stores various programs to be executed by the controller 16. A determination unit 16c, which will to be described below, stores image data 15a in the storage unit 15.

The image data 15a will be described below. The image data 15a contains various types of information in addition to the image data acquired by the first image capturing device 17 and the second image capturing device 18. For example, the image data 15a contains "CLK counter information" that corresponds to the number of clock counts indicating the time at which image data is loaded. The "CLK counter information" is the number of times a loading unit 16a counts a clock generated by the clock generator 13, which will be described below. The loading unit 16a adds the number of counts as the "CLK counter information" to the image data. The image data 15a contains an instruction for displaying a two-dimensional screen or a three-dimensional screen, which is an instruction added by the determination unit 16c.

The storage unit 15 is, for example, a semiconductor memory device, such as a flash memory, or a storage device, such as a hard disk or an optical disk. The storage unit 15 is not limited to the above-described types of storage devices. The storage unit 15 may be a random access memory (RAM) or a read only memory (ROM).

The controller 16 includes an internal memory for storing programs that define various procedures and control data and executes various types of processing using the programs and control data. The controller 16 includes the loading unit 16a, a block matching processor 16b, the determination unit 16c, an encoding processor 16d, and a transmission controller 16e.

The loading unit 16a loads a plurality of video image signals of stereo images between which a position of an object in the stereo images differs in accordance with the parallax. For example, the loading unit 16a loads the image data that is transmitted from the first image capturing device 17 and the second image capturing device 18 via the I/F 12.

The loading unit 16a counts clock signals that are transmitted from the clock generator 13. For example, the loading unit 16a detects a rise of a clock signal and, every time a rise is detected, increments the value of the counter. The counter can be referred to as the "timing counter" below.

The loading unit 16a adds the value of the timing counter acquired when the image data is received to the image data.

The block matching processor 16b performs block matching processing on the stereo images that are loaded by the loading unit 16a to detect a motion vector on a block-by-block basis in one of stereo images that are a set of right-eye and left eye images. Furthermore, the block matching processor 16b calculates similarity of each block of the stereo image.

The processing performed by the block matching processor 16b will be described here with a specific example. For example, the block matching processor 16b first divides each of the images corresponding to the right-eye or left-eye image data that is loaded by the loading unit 16a and added with the value of the timing counter.

Figure 2A:
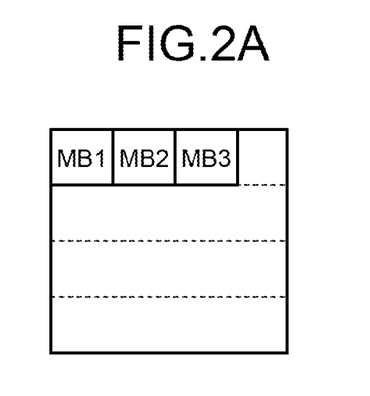
FIG. 2A is a diagram for explaining an example of processing performed by a block matching processor.
Figure 2B:
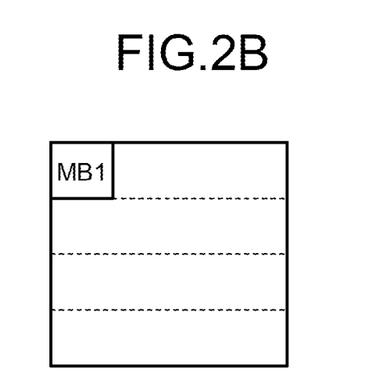
FIG. 2B is a diagram for explaining the example of processing performed by the block matching processor.
Figure 2C:
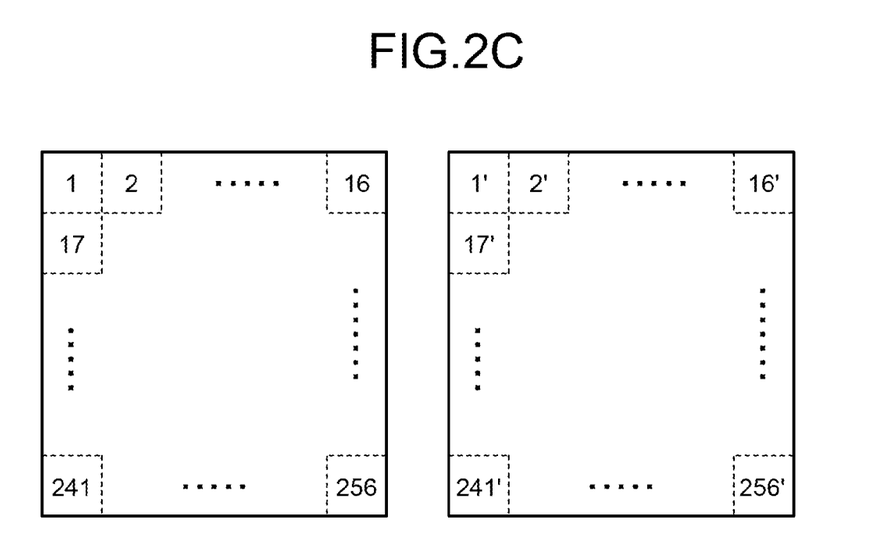
FIG. 2C is a diagram for explaining the example of processing performed by the block matching processor.

FIGS. 2A, 2B, 2C, and 2D are diagrams for explaining an example of processing performed by the block matching processor. FIGS. 2A and 2B illustrates a case where the block matching processor 16b divides the left-eye image data into multiple blocks MB1, MB2, MB2 . . . . FIG. 2C illustrates a case where each block consists of 256 pixels. The image data illustrated in FIGS. 2A and 2B is image data that is transmitted from any one of the first image capturing device 17 and the second image capturing device 18. The image data illustrated in FIG. 2B is image data that is transmitted after a given number of frames e.g., one frame, from the image data illustrated in FIG. 2A. The image data illustrated in FIG. 2A can be referred to as the "pre image data" below and the image data illustrated in FIG. 2B can be referred to as the "post image data" below. The "post image data" is new image data that is loaded by the loading unit 16a and the "pre image data" is the image that is loaded by the loading unit before the new image data.

The block matching processor 16b determines whether there is any unselected block among the multiple blocks of the post image data. When there is any unselected block, the block matching processor 16b selects one unselected block from among the blocks of the post image data. The block matching processor 16b then calculates a difference between the pixel value of each of pixels 1 to 256 of the selected block and the pixel value of each of pixels 1' to 256' of each of the blocks of the pre image data. The block matching processor 16b then calculates a sum of the calculated differences of the pre-image data on a block-by-block basis. The sum is a similarlity which becomes smaller when a degree of similarity between the pre image represented by the pre image data and the post image represented by the post image data becomes higher. In other words, when the similarity is smaller, the pre image and the post image are more similar to each other. Thus, the block matching processor 16b singles out a block with the smallest sum (similarity), which is calculated, from the pre image data.

Figure 3:
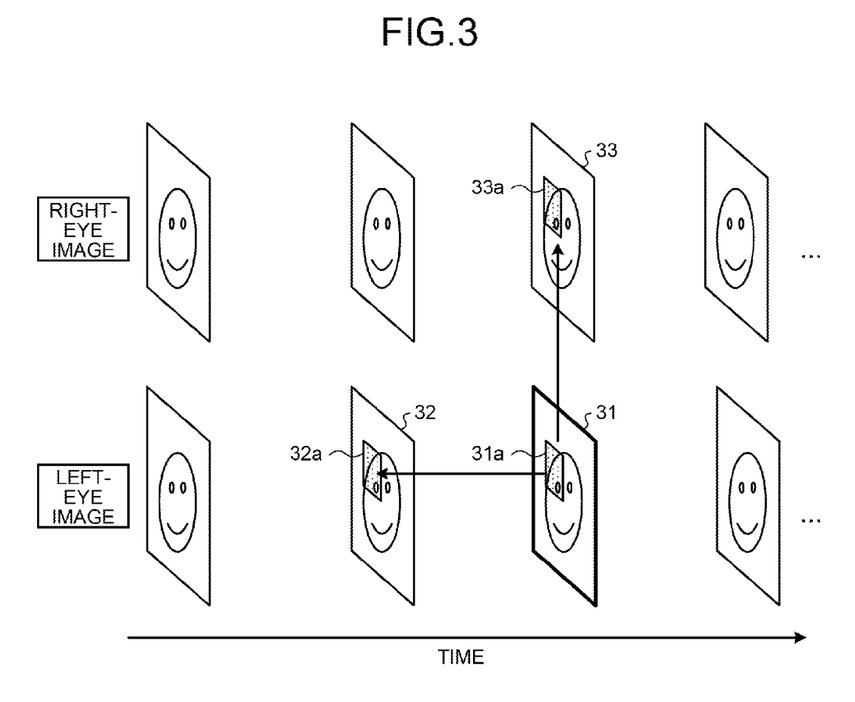
FIG. 3 illustrates an example of processing performed by the block matching processor.

The block matching processor 16b repeats such block matching processing until all the blocks of the post image data are selected. The block matching processor 16b performs block matching processing over one of the right-eye image data and left-eye image data that are a stereo pair. FIG. 3 is a diagram of an example of processing performed by the block matching processor. As illustrated in FIG. 3, the block matching processor 16b singles out, from a pre image 32, a block 32a with the smallest similarity to a block 31a that is selected from the post image data 31. In the following descriptions, block matching processing performed on the sets of image data previous and posterior according to the time sequence can be referred to as "chronological block matching" below.

When the determination unit 16c, which will be described below, determines that the value of a first counter, which will be described below, is equal to or smaller than a given threshold B, the block matching processor 16b performs similar block matching processing also on a pair of image data that is a stereo pair. For example, as illustrated in FIG. 3, the block matching processor 16b singles out, from an image 33, a block 33a with the smallest similarity to the block 31a that is selected from the left-eye image data 31. In the following descriptions, block matching processing performed on the pair of image data that is a stereo pair can be referred to as "spatial block matching" below.

When performing spatial block matching, the block matching processor 16b calculates a difference vector between the position of a block that is selected from one of the sets of image data of the right-eye and left-eye images and the position of a block that is singled out of the image data that is one set of image data of a stereo pair and detects the difference vector, which is calculated, as a motion vector.

Figure 2D:
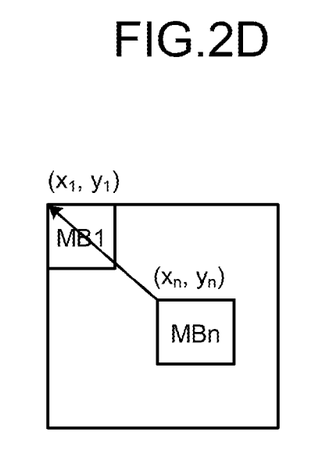
FIG. 2D is a diagram for explaining the example of processing performed by the block matching processor.

FIG. 2D illustrates a case where the block matching processor 16b selects a block MBn from the left-eye image. FIG. 2D also illustrates a case where the block matching processor 16b single out a block MB1 from the right-eye image. In the example illustrated in FIG. 2D, the block matching processor 16b detects a difference vector $(x_1-x_n, y_1-y_n)$ as a motion vector. In the example illustrated in FIG. 2D, the position of the block MBn of the left-eye image is represented by $(x_n, y_n)$ and the position of the block MB1 of the right-eye image is represented by $(x_1, y_1)$. The block matching processor 16b repeats such processing for detecting a motion vector until all blocks of the image data of the right image or the left images are selected. The block matching processor 16b then performs such processing for detecting a motion vector over one of the right-eye image data and left-eye image data.

When a motion vector is detected, the block matching processor 16b calculates the size of the detected motion vector. For example, when the motion vector is represented by (X,Y), the block matching processor 16b calculates a size S of the motion vector with the following Equation:

$$S^2 = X^2 + Y^2 \quad (1)$$

For each stereo image, the determination unit 16c determines to display a three-dimensional screen or a two-dimensional screen for each stereo image on the basis of the motion vector, which is detected by the block matching processor 16b, or the similarity, or on the basis of the motion vector and the similarity.

A specific example will be given below. For example, when the block matching processor 16b performs chronological block matching, the determination unit 16c determines whether the similarity of the singled-out pre image data is equal to or smaller than a threshold A. For the threshold A, an upper-limit of the similarity is set, with which it can be determined that two images are similar to each other. When the similarity is equal to or smaller than the threshold A, the pre image and the post images are similar to each other and accordingly the determination unit 16c increments the value of the first counter that is 0 by default. In this manner, the determination unit 16c performs the processing for setting a value in the first counter every time the block matching processor 16b performs chronological block matching. Thus, the value of the first counter increases in accordance with an increase in the number of blocks that are similar between the pre image and post image.

When the block matching processor 16b performs chronological block matching on all blocks of one image, the determination unit 16c determines whether the value of the first counter is larger than a given threshold B. When the value of the first counter is equal to or smaller than the threshold B, the spatial block matching is performed. Thereafter, the determination unit 16c performs the following processing with the similarity between the stereo images and the size of motion vector that are calculated in the spatial block matching. In other words, the determination unit 16c determines whether the similarity is greater than a given threshold C and, when the similarity is greater than the threshold C, the determination unit 16c increments the value of a second counter that is 0 by default. The determination unit 16c also determines whether the size of the motion vector is larger than a given threshold D and, when the size of the motion vector is larger than the given threshold D, the determination unit 16c increments the value of the second counter. In this manner, the determination unit 16c performs the processing for setting a value in the second counter every time when the block matching processor 16b performs spatial block matching. Thus, the value of the second counter increases in accordance with an increase in the parallax corresponding to the motion vector or in accordance with a decrease in the number of similar blocks between the stereo images. Users start to feel uncomfortable in accordance with an increase in the parallax corresponding to the motion vector between the stereo images. Furthermore, users start to feel uncomfortable in accordance with a decrease in the number of similar blocks between the stereo images.

When the block matching processor 16b performs spatial block matching on all the blocks in one image, the determination unit 16c determines whether the value of the second counter is larger than a threshold E.

When the value of the second counter is larger than the threshold E, the determination unit 16c adds an instruction for displaying a two-dimensional screen to the image with blocks on all of which the block matching processor 16b performs spatial block matching. In other words, the determination unit 16c determines to display a two-dimensional screen.

In contrast, when the value of the second counter is equal to or smaller than the threshold E, the determination unit 16c adds an instruction for displaying a three-dimensional screen to the image with blocks on all of which the block matching processor 16b performs spatial block matching. In other words, the determination unit 16c determines to display a three-dimensional screen.

When the value of the first counter is larger than the given threshold B and there is a previous frame, the determination unit 16c adds, to the post image data, the same instruction as that added to the previous frame. In this manner, when no scene change, etc. occurs between the pre and post images and the pre and post images are the same or approximately the same, the determination unit 16c can skip the above described various steps and add an instruction for a screen to be displayed, which reduces the processing load.

When the value of the first counter is larger than the given threshold B and there is not any previous frame, the determination unit 16c adds an instruction for displaying a two-dimensional screen to the image data that is loaded by the loading unit 16a.

The determination unit 16c then stores, in the storage unit 15, the image data 15a added with the instruction.

Upon receiving an instruction for transmitting the image data 15a from the terminal device 20 via the communication unit 14, the encoding processor 16d executes encoding processing for encoding the image data 15a, which is stored in the storage unit 15, with a given algorithm. The encoding processor 16d acquires the instruction that is added to each image and, when the acquired instruction is an instruction for displaying a two-dimensional screen, sets an instruction for displaying a two-dimensional screen in a given area of the encoded image data 15a. Similarly, the encoding processor 16d acquires an instruction that is added to each image and, when the acquired instruction is an instruction for displaying a three-dimensional screen, sets an instruction for displaying a three-dimensional screen in a given area of the encoded image data 15a.

Figure 4:
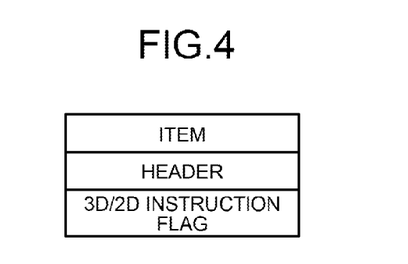
FIG. 4 is a diagram for explaining an example of processing executed by an encoding processor.

FIG. 4 is a diagram for explaining an example of processing performed by an encoding processor. For example, when the encoding algorithm employed by the encoding processor 16d is "H.264/MVC", the encoding processor 16d performs the following processing. As illustrated in FIG. 4, the encoding processor 16d adds items "HEADER" and "3D/2D INSTRUCTION FLAG" to the item "user_data_SEI". Furthermore, the encoding processor 16d registers, in the item "HEADER", information indicating it is a flag for giving an instruction for displaying a three-dimensional or two-dimensional screen, i.e., a message "3D/2D INSTRUCTION FLAG". Furthermore, when the acquired instruction is an instruction for displaying a three-dimensional screen, the encoding processor 16d sets an instruction for displaying a three-dimensional screen, i.e., "1" in the item "3D/2D INSTRUCTION FLAG". Furthermore, when the acquired instruction is an instruction for displaying a two-dimensional screen, the encoding processor 16d sets an instruction for displaying a two-dimensional screen, i.e., "0" in the item "3D/2D SPECIFYING INSTRUCTION FLAG".

The transmission controller 16e transmits, to the communication unit 14, a stream of the image data 15a that is encoded by the encoding processor 16d. Accordingly, the communication unit 14 transmits the image data 15a, which is encoded by the encoding processor 16d, to the terminal device 20 via the network 30. In other words, the transmission controller 16e outputs the encoded image data.

The controller 16 is an integrated circuit, such as an application specific integrated circuit (ASIC) or a field programmable gate array (FPGA) or is an electronic circuit such as a central processing unit (CPU) or a micro processing unit (MPU).

The following descriptions refer back to FIG. 1. The terminal device 20 is a terminal device that acquires a three-dimensional image or two-dimensional image from the determination device 10. For the terminal device 20, various terminals devices, such as a mobile phone or a personal digital assistant (PDA) can be used. The terminal device 20 includes a communication unit 21, a display unit 22, a storage unit 23, and a controller 24.

The communication unit 21 implements communications of the terminal device 20 with the determination device 10. For example, upon receiving the encoded image data from the determination device 10, the communication unit 21 transmits the received image data to the controller 24. Upon receiving an instruction for transmitting the image data 15a from an operation receiver, such as a mouse and keyboard for receiving an instruction from a user, the communication unit 21 transmits the received instruction to the determination device 10 via the network 30.

The display unit 22 displays various types of information. For example, under the control of a display controller 24c, which will be described below, the display unit 22 displays a two-dimensional or three-dimensional image that is represented by the image data 15a transmitted from the determination device 10.

The storage unit 23 stores various types of information. For example, an acquisition unit 24a, which will be described below, stores image data in the storage unit 23.

The storage unit 23 is, for example, a semiconductor memory device, such as a flash memory, or a storage device, such as a hard disk or an optical disk. The storage unit 23 is not limited to the above-described types of storage device. The storage unit 23 may be a RAM or ROM.

The controller 24 includes an internal memory for storing programs that define various types of procedures and control data and executes various types of processing with the programs and control data. The controller 24 includes the acquisition unit 24a, a decoding processor 24b, and the display controller 24c.

The acquisition unit 24a receives image data (frames) from the communication unit 21 and stores the received image data 23a in the storage unit 23. The image data 23a is obtained by encoding the image data 15a.

The decoding processor 24b performs decoding processing to decode the image data 23a.

The display controller 24c acquires, for each image, an instruction contained in the image data decoded by the decoding processor 24b. The display controller 24c then determines whether the acquired instruction is an instruction for displaying a two-dimensional screen.

When the acquired instruction is an instruction for displaying a two-dimensional screen, the display controller 24c displays a two-dimensional screen by controlling the display of the display unit 22 such that one screen to which the acquired instruction is added is displayed. When the acquired instruction is not an instruction for displaying a two-dimensional screen, i.e., is an instruction for displaying a three-dimensional screen, the display controller 24c performs the following processing. Specifically, the display controller 24c determines whether the acquisition unit 24a has acquired a screen that is one of a pair of screens with one screen added with the acquired instruction. For example, the display controller 24c determines whether there is an image with a value, in the item of "CLK counter information", within a given range covering the value of "CLK counter information" added to one screen to which the acquired instruction is added.

When the screen has been acquired, the display controller 24c determines the screen that is one of the pair with the screen added with the acquired instruction. The display controller 24c then displays a three-dimensional screen by controlling the display of the display unit 22 such that the screen added with the acquired instruction and the determined screen that is one of the pair are displayed.

The controller 24 is an integrated circuit, such as an application specific integrated circuit (ASIC) or a field programmable gate array (FPGA) or is an electronic circuit such as a central processing unit (CPU) or a micro processing unit (MPU).

Processing Flow

Figure 5:
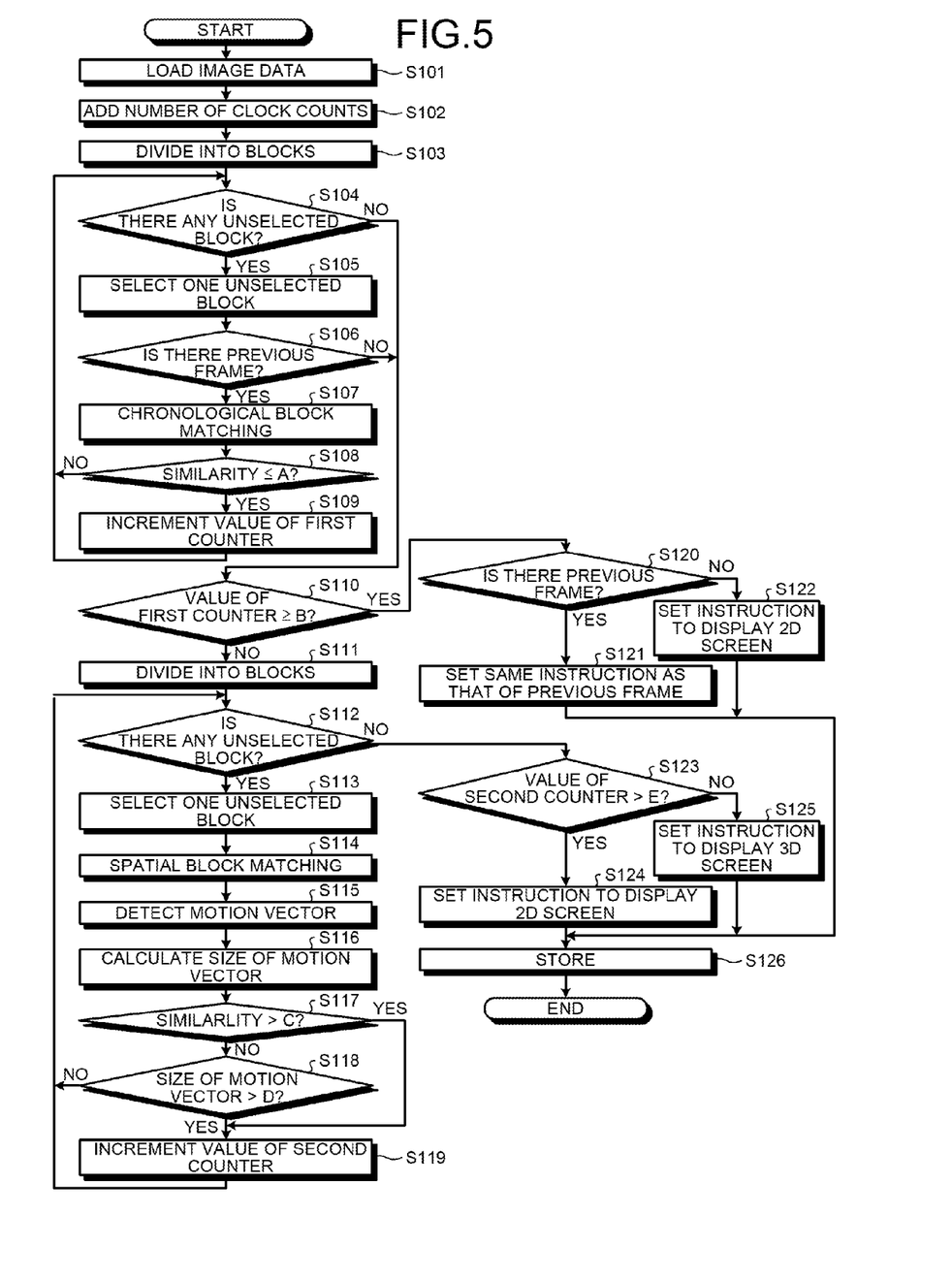
FIG. 5 is a flowchart of a procedure of determination processing according to the embodiment.

The flow of processing performed by the determination device 10 according to the embodiment will be described here. FIG. 5 is a flowchart of a procedure of determination processing according to the embodiment. Various timings can be assumed to perform the determination processing. For example, the determination processing is performed every time image data is transmitted from the first image capturing device 17 and the second image capturing device 18 during a period in which the power of the determination device 10 is on.

As illustrated in FIG. 5, the loading unit 16a loads image data (step S101). The loading unit 16a adds the value of the timing counter acquired when the image data is received to the image data (step S102). The block matching processor 16b divides the image that is represented by the right-eye or left-eye image data that is loaded by the loading unit 16a and added with the value of the timing counter (step S103).

The block matching processor 16b determines whether there is any unselected block among multiple blocks of the loaded image data (step S104). When there is not any unselected block (NO at step S104). The processing goes to step S110.

When there is any unselected block (YES at step S104), the block matching processor 16b selects one unselected block from among the multiple blocks of the image data (step S105). The block matching processor 16b determines whether there is a frame (image) previous to the loaded image data (step S106). When there is not any frame previous to the loaded image data (NO at step S106), the processing goes to step S110. When there is a frame previous to the loaded image data (YES at step S106), the block matching processor 16b performs the above-described chronological block matching (step S107).

The determination unit 16c determines whether the similarity of a block that is singled out of the pre image data in the chronological block matching is equal to or smaller than a threshold A (step S108). When the similarity is equal to or smaller than the threshold A (YES at step S108), the determination unit 16c increments the value of the first counter (step S109) and the processing returns to step S104.

The determination unit 16c determines whether the value of the first counter is larger than the threshold B (step S110). When the value of the first counter is equal to or less than the given threshold B (NO at step S110), the block matching processor 16b divides the image that is represented by the right-eye or left-eye image data that is loaded by the loading unit 16a (step S111).

The block matching processor 16b then determines whether there is any unselected block from among multiple blocks of the loaded image data (step S112).

When there is any unselected block (YES at step S112), the block matching processor 16b selects one unselected block from among the multiple blocks of the image data (step S113). The block matching processor 16b then performs the above-described spatial block matching (step S114). The block matching processor 16b then detects a motion vector (step S115). Subsequently, the block matching processor 16b calculates the size of the motion vector (step S116).

The determination unit 16c determines whether the similarity is larger than a threshold C (step S117). When the similarity is larger than the threshold C (YES at step S117), the determination unit 16c increments the value of the second counter that is 0 by default (step S119) and the processing returns to step S112. In contrast, when the similarity is equal to or smaller than the threshold C (NO at step S117), the determination unit 16c determines whether the size of the motion vector is larger than a given threshold D (step S118). When the size of the motion vector is larger than the given threshold D (YES at step S118), the processing goes to step S119.

When the value of the first counter is larger than the given threshold B (YES at step S110), the block matching processor 16b determines whether there is a previous frame (step S120). When there is a previous frame (YES at step S120), the determination unit 16c adds the same instruction as that added to the previous frame to post image data, (step S121). The determination unit 16c then stores the image data that is added with the instruction in the storage unit 15 (step S126) and the processing ends.

When there is not any previous frame (NO at step S120), the determination unit 16c adds an instruction for displaying a two-dimensional screen to the image data that is loaded by the loading unit 16a (step S122) and goes to step S126.

When there is not any unselected block (NO at step S112), the determination unit 16c determines whether the value of the second counter is larger than a given threshold E (step S123). When the value of the second counter is larger than the threshold E (YES at step S123), the determination unit 16c adds an instruction for displaying a two-dimensional screen to the image with blocks on all of which the block matching processor 16b has performed the spatial block matching (step S124) and the processing goes to step S126.

When the value of the second counter is equal to or smaller than the given threshold E (NO at step S123), the determination unit 16c adds an instruction for displaying a three-dimensional screen to the image with blocks on all of which the block matching processor 16b has performed the spatial block matching (step S125) and the processing goes to step S126.

Figure 6:
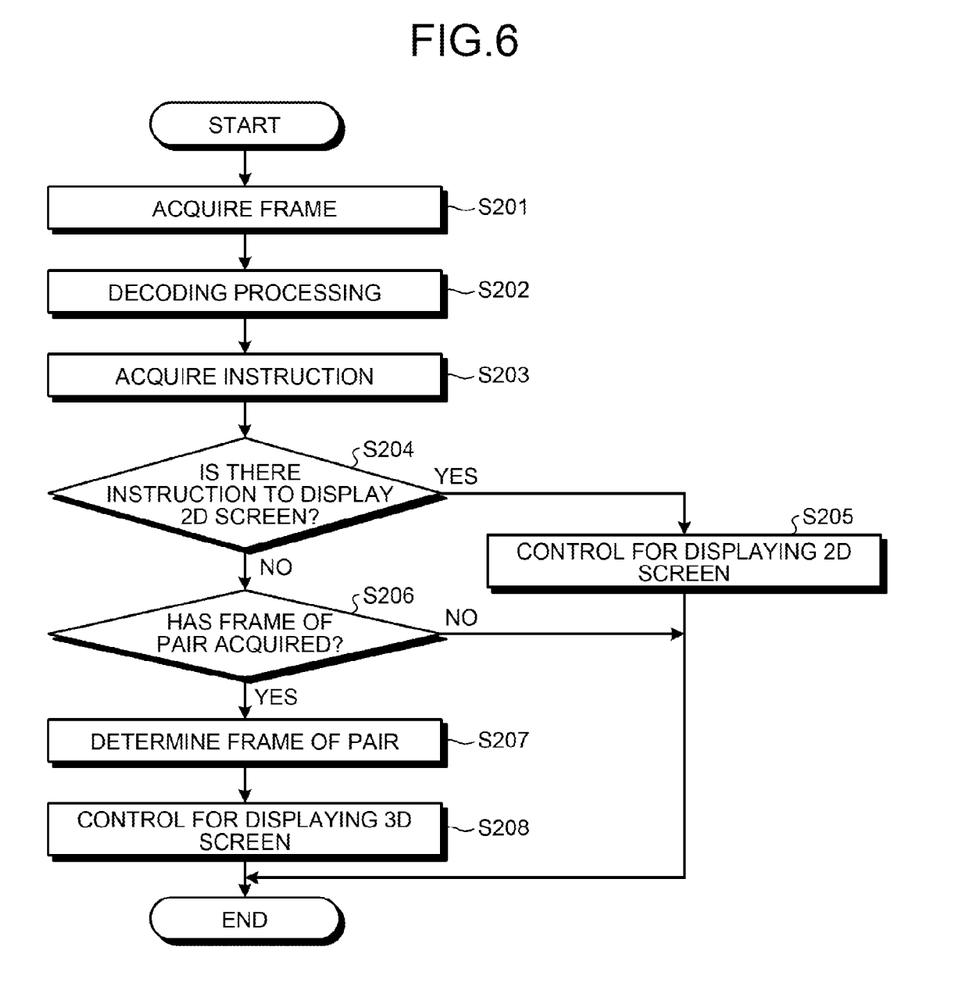
FIG. 6 is a flowchart of a procedure of display control processing according to the embodiment.

The flow of processing performed by the terminal device 20 according to the embodiment will be described here. FIG. 6 is a flowchart of a procedure of the display control processing according to the embodiment. Various timings to perform the display control processing can be assumed. For example, the display control processing is performed every time the controller 24 receives encoded image data, which is transmitted from the determination device 10, during a period in which the power of the terminal device 20 is on.

As illustrated in FIG. 6, the acquisition unit 24a receives and thus acquires image data (frame) from the communication unit 21 and stores the acquired image data 23a in the storage unit 23 (step S201). The decoding processor 24b performs decoding processing for decoding the image data 23a (step S202).

Subsequently, the display controller 24c acquires, for each image, an instruction that is contained in the image data decoded by the decoding processor 24b (step S203). The display controller 24c determines whether the acquired instruction is an instruction for displaying a two-dimensional screen (step S204).

When the acquired instruction is an instruction for displaying a two-dimensional screen (YES at step S204), the display controller 24c displays a two-dimensional screen by controlling the display of the display unit 22 such that one screen added with the acquired instruction is displayed (step S205), and the processing ends. When the acquired instruction is not an instruction for displaying a two-dimensional screen, i.e., is an instruction for displaying a three-dimensional screen (NO at step S204), the display controller 24c performs the following processing. Specifically, the display controller 24c determines whether the acquisition unit 24a has acquired a screen that is one of a pair with the screen added with the acquired instruction (step S206).

When the acquisition unit 24a has acquired the screen (YES at step S206), the display controller 24c determines the screen that is one of the pair with the screen added with the acquired instruction (step S207). The display controller 24c then displays a three-dimensional screen by controlling the display of the display unit 22 such that the screen that is added with the acquired instruction and the determined screen that is one of the pair (step S208) and ends the processing. The processing ends also when the screen has not been acquired (NO at step S206).

Effect of Embodiment

As described above, in the system 1 according to the embodiment, the determination device 10 can determine to display a two-dimensional image or a three-dimensional image without heavy-load processing, e.g., block matching processing, performed by the terminal device 20. Accordingly, the system 1 and the determination device 10 can reduce the processing load of the terminal device 20 that displays images.

Because the determination device 10 according to the embodiment uses the conventional block matching processor to calculate a motion vector and similarity, it can be determined to display a two-dimensional image or a three-dimensional image without a new processor.

When a previous frame and a posterior frame are similar to each other, the determination device 10 can make a determination to display a three-dimensional image or a two-dimensional image, which is a determination made for the previous frame, for the posterior frame. Thus, a screen display can be determined with simple processing.

The embodiment of the device disclosed herein has been described above. Alternatively, the invention may be carried out in various different modes in addition to the above-described embodiment. Other embodiments that the scope of the invention covers will be described below.

The processing described in the embodiment as one automatically performed may be performed manually entirely or partly.

Furthermore, the steps of each set of processing described in the embodiment may be divided or performed collectively according to various types of load and circumstances. Alternatively, a step(s) may be omitted.

According to various types of load and circumstances, the order in which the processing steps described for the embodiment are performed can be changed.

The components of each device illustrated in the drawings are functional ideas and are not required to be configured physically as illustrated in the drawings. In other words, specific separation and integration between devices are not limited to those illustrated in the drawings and the devices may be configured in a way that they are entirely or partly separated or integrated functionally or physically according to various types of load or circumstances and according to an arbitrary unit.

Determination Program

The determination processing performed by the determination device 10 can be also implemented by executing a prepared program with a computer system such as a personal computer or a work station. An example of the computer that executes the determination program with the same functions as those of the determination device 10, which has been described in the embodiment, will be described below with reference to FIG. 7.

Figure 7:
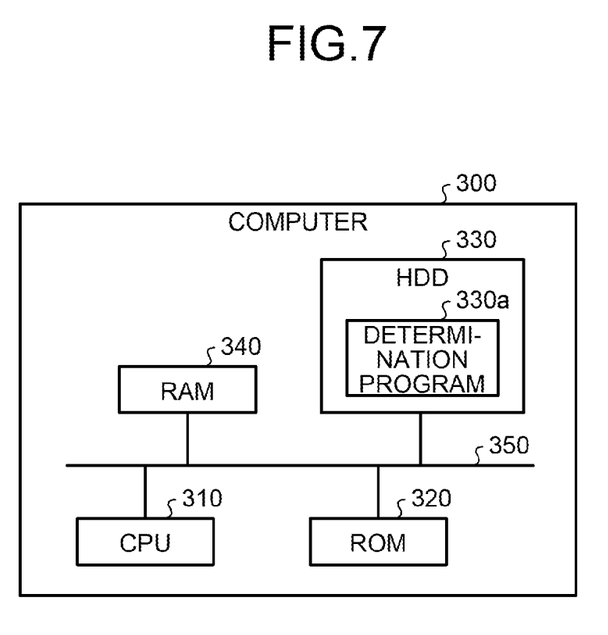
FIG. 7 illustrates a computer that executes a determination program.

FIG. 7 illustrates a computer that executes the determination program. As illustrated in FIG. 7, a computer 300 includes a central processing unit (CPU) 310, a read only memory (ROM) 320, a hard disk drive (HDD) 330, a random access memory (RAM) 340. Each of the components 300 to 340 are connected to one another via a bus 350.

The HDD 330 previously stores a determination program 330a that implements the same functions as those of the loading unit 16a, the block matching processor 16b, the determination unit 16c, the encoding processor 16d, and the transmission controller 16e. The determination program 330a may be divided as appropriate.

The CPU 310 reads the determination program 330a from the HDD 330 and executes the determination program.

Furthermore, the HDD 330 is provided with image data. The image data corresponds to the image data 15a.

The CPU 310 reads the image data and stores the image data in the RAM 340. Furthermore, the CPU 310 uses the image data, which is stored in the RAM 340, to execute the determination program. All data stored in the RAM 340 is not necessarily stored in the RAM 340. It is satisfactory if only data used for the processing is stored in the RAM 340.

The above-described determination program is not necessarily stored in the HDD 330 from the beginning.

For example, the determination program may be stored in a "portable physical medium" such as a flexible disk (FD), a CD-ROM, a DVD disk, a magneto-optical disk, or an IC card and the computer 300 may read the program from the portable physical medium and executes the program.

Alternatively, the program may be stored in, for example, "another computer (or server)" that is connected to the computer 300 via, for example, a public line, the Internet, a LAN, or a WAN. The computer 300 may reads the program from the computer and execute the program.

According to an aspect of the determination device disclosed herein, the processing load on a device that displays images can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A determination device comprising:
a memory; and
a processor coupled to the memory, wherein the processor executes a process including:
loading a plurality of video image signals including stereo images between which a position of an object in the stereo images differs in accordance with a parallax;
performing block matching processing on the stereo images to detect a motion vector on a block-by-block basis in one of the stereo images and to calculate similarity on a block-by-block basis;
determining whether to display a three-dimensional screen based on the stereo images or a two-dimensional screen, based on the motion vector or the similarity, or a combination thereof; and adding a result of the determining to the stereo images and outputting the stereo images added with the result to a display device that displays the stereo images.

2. The determination device according to claim 1, wherein the determining includes counting the number of motion vectors in a size larger than a first predetermined value with respect to all blocks, and determining to display the two-dimensional screen when the number of counts is larger than a second predetermined value.

3. The determination device according to claim 2, wherein the determining includes determining to display the two-dimensional screen when the number of blocks that are determined to be similar between the stereo images from among all blocks is larger than the second predetermined value.

4. The determination device according to claim 1, wherein the determining includes determining to display, when one of the stereo images and a previous image with respect to the one of the stereo images are similar to each other, either the two-dimensional screen or the three-dimensional screen determined for stereo images including the previous image as a screen for the stereo images including the one of the stereo images.

5. A non-transitory computer-readable recording medium having stored therein a determination program causing a computer to execute a process comprising:

loading a plurality of video image signals including stereo images between which a position of an object in the stereo images differs in accordance with a parallax;

performing block matching processing on the stereo images to detect a motion vector on a block-by-block basis in one of the stereo images and to calculate similarity on a block-by-block basis;

determining whether to display a three-dimensional screen based on the stereo images or a two-dimensional screen, based on the motion vector or the similarity, or a combination thereof; and adding a result of the determining to the stereo images and outputting the stereo images added with the result to a display device that displays the stereo images.

6. A determination method performed by a computer, the determination method comprising:

loading, using a processor, a plurality of video image signals including stereo images between which a position of an object in the stereo images differs in accordance with a parallax;

performing, using the processor, block matching processing on the stereo images to detect a motion vector on a block-by-block basis in one of the stereo images and to calculate similarity on a block-by-block basis;

determining, using the processor, whether to display a three-dimensional screen based on the stereo images or a two-dimensional screen, based on the motion vector or the similarity, or a combination thereof; and adding, using the processor, a result of the determining to the stereo images and outputting the stereo images added with the result to a display device that displays the stereo images.

* * * * *